UNITED STATES PATENT OFFICE.

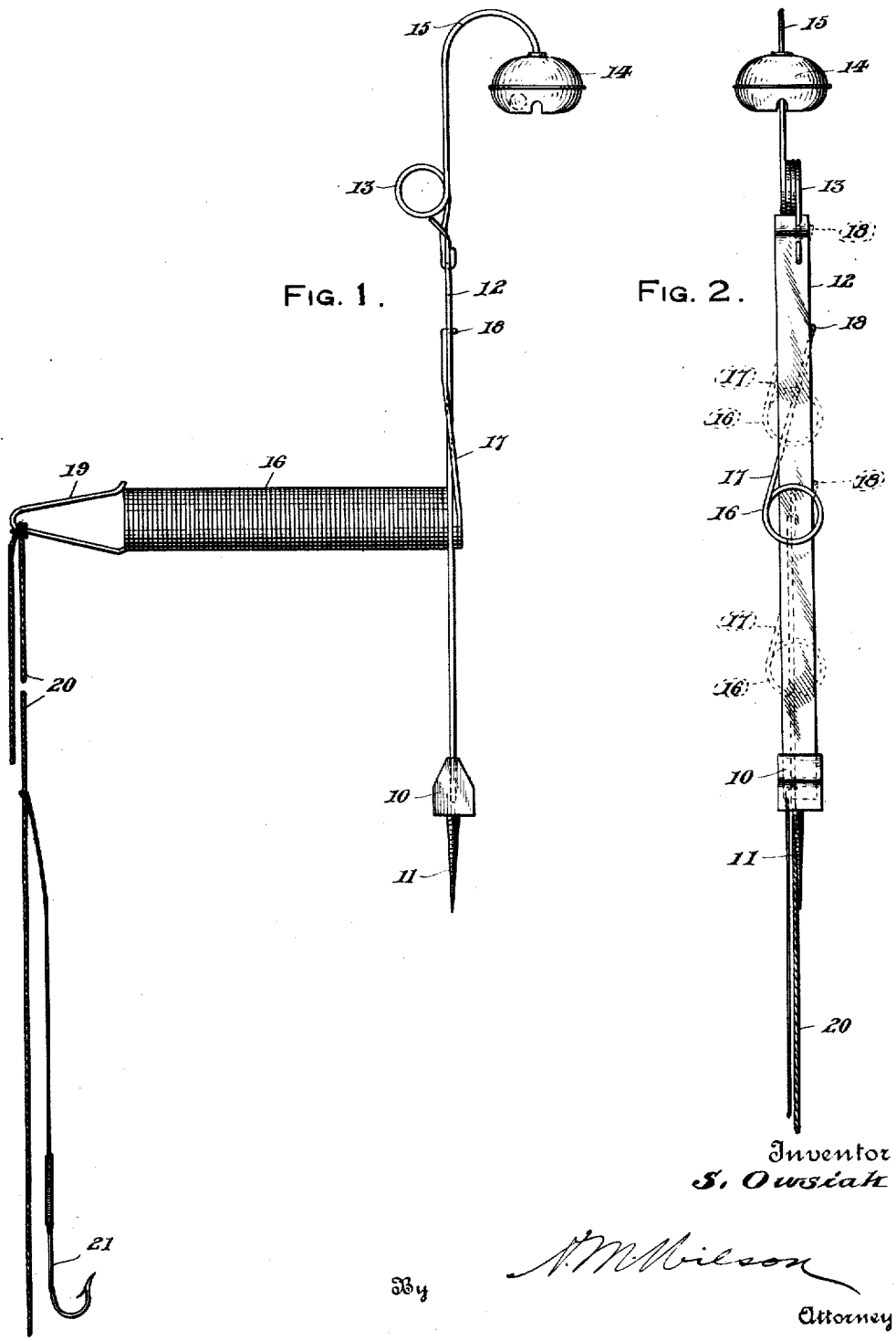

STEPHEN OWSIAK, OF CHICAGO, ILLINOIS.

FISHING-SIGNAL.

1,349,528.  Specification of Letters Patent.  Patented Aug. 10, 1920.

Application filed November 18, 1919. Serial No. 338,911.

*To all whom it may concern:*

Be it known that I, STEPHEN OWSIAK, a citizen of Poland, residing at Chicago, in the county of Cook and State of Illinois, have invented certain new and useful Improvements in Fishing-Signals, of which the following is a specification.

The primary object of the invention is the provision of a sensitive alarm adapted for automatic sounding when a fish is upon the hook of a fish line or is biting the bait upon the hook and whereby the owner of the fish line is advised of the fact for drawing in the line.

A further object of the invention is the provision of a fishing device in which an audible alarm is adapted to be sounded by a pull of predetermined strength upon the fishing line, the device being adjustable whereby either a slight nibble upon the bait or the jerk or pull of a caught fish upon the hook will be required to sound the alarm.

A still further object of the invention is the provision of a device that is cheap and inexpensive to manufacture adapted for adjustably holding a fish line during the fishing operation for automatically producing a signal to the owner that a fish is biting the bait upon the line.

With these general objects in view, the invention consits of the novel combination and arrangement of parts hereinafter more fully described in connection with the accompanying drawing and in which like reference characters designate corresponding parts throughout the several views.

In the drawing,

Figure 1 is a side elevation of the invention with the fishing line broken away, and Fig. 2 is a rear elevation thereof.

My invention provides a weighted base 10 having a screw 11 for firmly mounting the base upon any support upon the land adjacent the water in which the owner is fishing, an upright leaf spring 12 carried by the base 10 having a coil spring 13 secured to the top thereof with an alarm bell 14 attached to the free end of the rearwardly curved terminal portion 15 of said spring 13.

A laterally flexible coil 16 formed of a closely coiled helical spring is adapted for adjustable mounting upon the upright or leaf spring 12 with the upright 12 forcibly received between adjacent helixes of the coil 16 adjacent one end of said coil. A terminal portion 17 of the coil 16 in the form of an arm is bent from the rear side of the upright 12 around the forward side of said upright terminating in a hook 18 slidably contacting the adjacent side of the upright 12. In this manner, the coil 16 may be slidably moved longitudinally on the upright 12 upwardly or downwardly for adjustable positioning as illustrated by dotted lines in Fig. 2 of the drawing.

A loop 19 formed at the opposite forward end of the coil 16 from the arm 17 has the fish line 20 secured thereto by tying or knotting while one or more fish hooks 21 are secured to the line 20 in the usual manner.

When a fish nibbles or bites the bait upon the hook 21 or becomes caught upon said hook, the pull or jerk exerted by the fish upon the line 20 flexes the coil 16 thereby vibrating the upright spring 12 and ringing the bell 14. When the owner of the fish tackle hears the ringing of the bell 14 he is advised that a fish has moved the hook 21 and the owner will pull up the line 20 drawing the hook 21 and fish to the shore. When the coil 16 is slid to a point adjacent the upper end of the upright 12, only a slight pull upon the line 20 will cause the bell 14 to ring but if it is desired that the bell shall ring only when a fish is actually caught upon the hook 21, the coil 16 is lowered upon the upright 12 to a point adjacent the base 10 so that greater force is required to be exerted upon the coil 16 to cause sufficient vibration of the upright 12 to ring the bell 14.

An adjustable fish alarm is provided that is easy and inexpensive to manufacture and readily installed for use whereby a fisherman with a plurality of these devices may oversee a large number of fish lines for catching a great number of fish with less effort and more certainty than in the usual way of employing the fish line alone.

While the form of the invention herein set forth is believed preferable, it will be understood that minor changes may be made therein without departing from the spirit and scope of my invention.

What I claim as new is:—

1. A fishing device comprising a mounting base, a flexible upright carried thereby, a flexible member upon the free end of the upright, an alarm bell at the free end of the flexible member, and a flexible and extensible fish line holder longitudinally adjustable upon said upright whereby the device may be set for actuating said bell by different strengths of pull exerted upon the line holder.

2. A fishing device comprising a mounting base, a flexible upright carried thereby, a flexible member upon the free end of the upright, an alarm bell at the free end of the flexible member, a coil spring slidably mounted upon said upright normally projecting forwardly thereof, and a fish line secured adjacent the outer free end of said coil spring adapted when a fish is caught upon the line for moving said coil spring and vibrating the upright whereby the bell is automatically sounded.

3. A device of the class described comprising a flexible upright, an alarm bell carried thereby adapted for sounding when the upright is vibrated, and a flexible and extensible coil adjustable longitudinally of the upright adapted for holding a fish line during the operation of the device.

In testimony whereof I affix my signature.

STEPHEN OWSIAK.